United States Patent

[11] 3,597,661

[72] Inventor Sherrill F. Isaacs
 Bartlesville, Okla.
[21] Appl. No. 19,205
[22] Filed Mar. 13, 1970
[45] Patented Aug. 3, 1971
[73] Assignee Phillips Petroleum Company

[54] MONITORING AND SHUTDOWN APPARATUS
 5 Claims, 1 Drawing Fig.
[52] U.S. Cl. .................................................. 317/135,
 317/135 A, 317/141 S, 317/148.5, 307/252,
 307/254, 340/52, 340/267
[51] Int. Cl. ........................................................ H01h 47/32
[50] Field of Search .......................................... 317/135,
 148.5, 141.S; 307/117, 118, 125, 252, 254, 255,
 308; 340/52, 57, 419, 261, 270

[56] References Cited
UNITED STATES PATENTS
3,170,689 2/1965 Brown et al. ................. 307/117 X
3,441,808 4/1969 Crane ............................ 317/135 A Primary Examiner—Lee T. Hix
Attorney—Young and Quigg ABSTRACT: A control circuit for a monitoring device employs two timing elements of different durations. A signal from the monitor actuates the shorter duration-timing element, and the output from this timing elements actuates the longer duration timing element. An alarm or shutdown control is actuated if a second signal is received from the monitor during the timing interval of the longer duration-timing element.

PATENTED AUG 3 1971
3,597,661
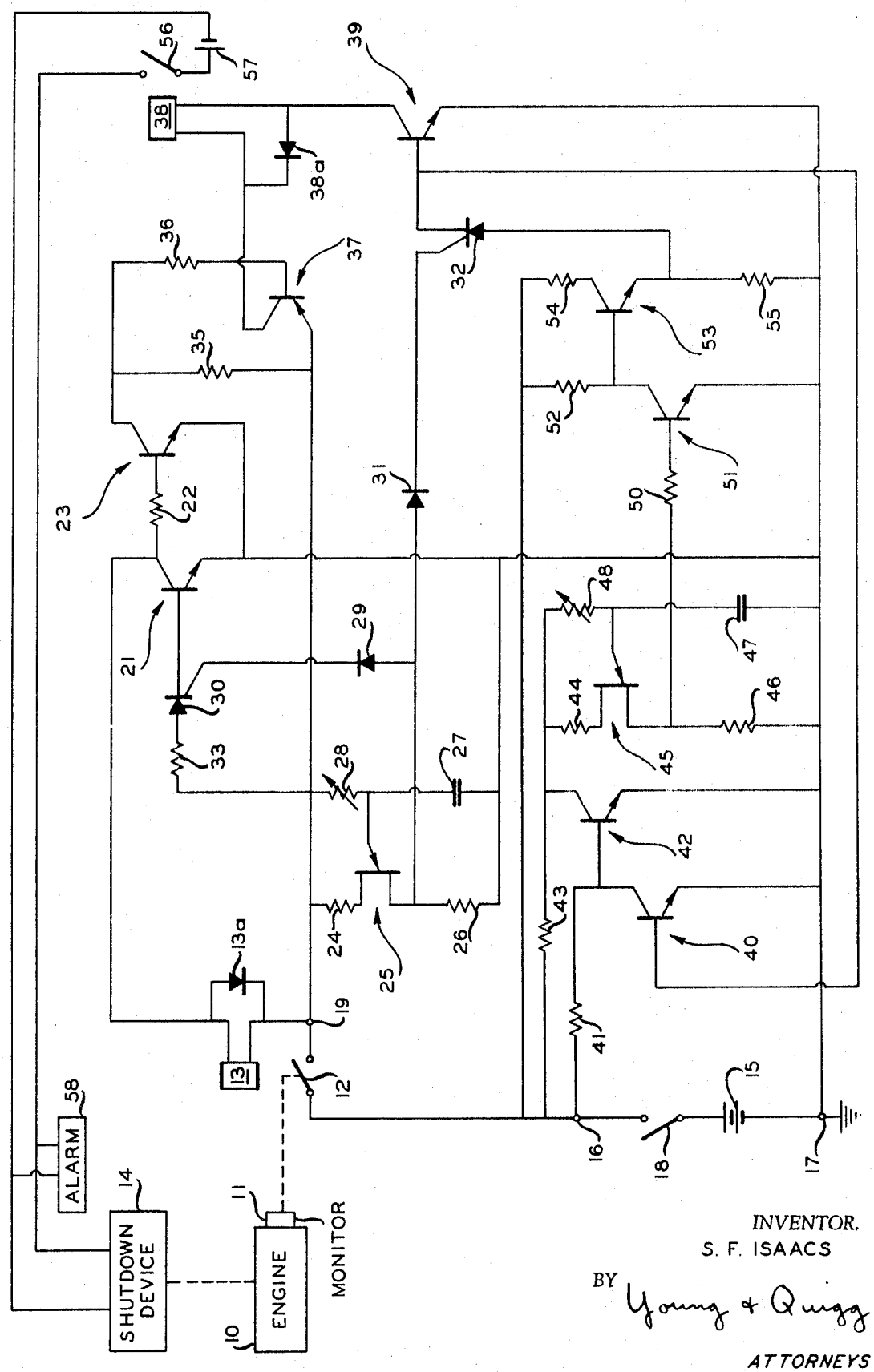
INVENTOR.
S. F. ISAACS
BY Young & Quigg
ATTORNEYS

MONITORING AND SHUTDOWN APPARATUS

Safety devices of various types are commonly employed to monitor the operations of machines and processes. These safety devices measure an operating variable and provide an alarm or shutdown signal whenever the variable extends certain limits. For example, it is common practice to attach vibration-sensing elements to machinery to shut down the machinery if excessive vibrations are detected. Flow monitors are used to detect the flow of lubricating oil to engines and compressors. Still another example of such a safety device involves the use of temperature-sensing elements to detect excessively high temperatures in various systems.

A problem is frequently encountered in the use of safety monitors of this type if the monitor is constructed so that a single output signal above a threshold level results in automatically shutting down the apparatus being monitored. While this may be the ultimate purpose of the monitoring devices, it is often not necessary to take such drastic action of the output signal exceeds the threshold level only momentarily. For example, the backfiring of an engine on startup may result in temporary excess vibration. However, this is not a permanent situation and does not require the engine to be shut down. In view of the fact that the shutting down of large compressors, pumps and engines can be an expensive operation and can cause serious operating problems, it is necessary to prevent the shutdown mechanism from being actuated each time a single "failure" is established.

A solution of this problem is provided in accordance with the present invention. Control apparatus is provided which includes two separate timing elements. The first is actuated when an output signal of preselected magnitude is received from a monitoring device. A reset mechanism is actuated by the first timing element in order to prepare the control apparatus to receive a second signal. The second timing element is actuated by the first timing element to provide a reset signal after a delay of longer duration than the delay of the first timing element. An output signal is established if the first timing element is actuated a second time during the timing interval of the second timing element. This output signal can control a suitable alarm and/or shutdown device.

The accompanying drawing is a schematic circuit illustration of an embodiment of the apparatus of this invention.

Referring now to the drawing in detail, there is shown an engine 10 which is provided with a monitoring device 11. Engine 10 can represent a pump, compressor or any other type of machine, the operation of which is to be controlled. Monitor 11 establishes an output signal when a measured variable exceeds predetermined limits. For example, this monitor can be a vibration detector, a flow detector to measure the flow of lubricating oil in the engine, or a temperature-sensing device. The output signal from monitor 11 closes a switch 12 whenever the detected variable exceeds a preset value. A relay coil 13, which is shunted by a diode 13a is associated with switch 12 to open a switch when the relay coil is energized. A shutdown device 14 is connected to engine 10 to shut down the engine when an output signal is received from the control circuit of this invention. Device 14 can turn off power to the engine or perform any other suitable operation to shut down the engine.

The control circuit of this invention is energized by a voltage source 15 which is connected across terminals 16 and 17 when a switch 18 is closed. Terminal 16 is connected to a terminal 19 when switch 12 is closed. One terminal of relay coil 13 is connected to terminal 19. The second terminal of the relay coil is connected directly to the collector of a transistor 21 and through a resistor 22 to the base of transistor 23. The emitters of transistors 21 and 23 are connected to grounded terminal 17. Reset relay coil 13 is thus energized when switch 12 is closed and transistor 21 is in a conducting state.

A resistor 24 is connected between terminal 19 and the first base of a unijunction transistor 25. A resistor 26 is connected between the second base of transistor 25 and ground. A capacitor 27 is connected between the emitter of transistor 25 and ground. A variable resistor 28 is connected between the emitter of transistor 25 and terminal 19. The second base of transistor 25 is connected by a first diode 29 to the gate electrode of a first silicon-controlled rectifier 32. A resistor 33 is connected between terminal 19 and the anode of rectifier 30. The cathode of rectifier 30 is connected to the base of transistor 21.

A resistor 35 is connected between terminal 19 and the collector of transistor 23. The collector of transistor 23 is connected by a resistor 36 to the base of a transistor 37. The emitter of transistor 37 is connected to terminal 19, and the collector of transistor 37 is connected to the first terminal of a second relay coil 38, which is shunted by a diode 38a. The second terminal of relay coil 38 is connected to the collector of a transistor 39. The emitter of transistor 39 is connected to ground. The base of transistor 39 is connected to the cathode of silicon-controlled rectifier 32 and to the base of a transistor 40. The collector of transistor 40 is connected by a resistor 41 to a terminal 16, and the emitter of transistor 40 is connected to ground. The collector of transistor 40 is also connected to the base of a transistor 42. The collector of transistor 42 is connected by a resistor 43 to terminal 16, and the emitter of transistor 42 is connected to ground.

A resistor 44 is connected between the collector of transistor 42 and the first base of a unijunction transistor 45. A resistor 46 is connected between the second base of transistor 45 and ground. A capacitor 47 is connected between ground and the emitter of transistor 45. A variable resistor 48 is connected between the emitter of transistor 45 and resistor 43. The second base of transistor 45 is connected by a resistor 50 to the base of a transistor 51. The emitter of transistor 51 is connected to ground, and the collector of transistor 51 is connected by a resistor 52 to terminal 16. The collector of transistor 51 is also connected to the base of transistor 53. The collector of transistor 53 is connected by a resistor 54 to terminal 16, and the emitter of transistor 53 is connected by a resistor 55 to ground. The emitter of transistor 53 is also connected to the anode of silicon-controlled rectifier 32.

A switch is closed when relay coil 38 is energized. Closure of switch 56 completes a circuit between a current source 57 and shutdown device 14. The shutdown device is thus energized to shutdown engine 10 when relay coil 38 is energized. A suitable alarm 58 can be connected in parallel with shutdown device 14 to notify an operator that the shutdown device has been energized. While element 10 has been referred to herein as an engine for purposes of illustration, this element can represent any type of machine, apparatus or process, the operation of which is to be monitored and controlled.

When switch 18 is closed the monitoring circuit is energized to control the operation of engine 10. At this time, transistor 51 is nonconducting, but transistor 53 conducts to apply a potential to the anode of rectifier 32. As long as the output signal from monitor 11 remains below a preselected threshold level, switch 12 remains open and relay coil 38 remains deenergized. However, an output signal from the monitor above the threshold level results in switch 12 being closed. Transistor 21 initially is in a nonconducting state so that a circuit path is not completed between terminal 19 and ground through relay coil 13. However, closure of switch 12 results in capacitor 27 being charged through variable resistor 28. At the end of a predetermined time interval, which is established by the size of capacitor 27 and the setting of resistor 28, a sufficient charge accumulates on capacitor 27 to fire unijunction transistor 25. This results in a pulse being transmitted through diode 29 and 31 to the gate electrodes of respectively silicon-controlled rectifiers 30 and 32. The pulse applied to rectifier 30 permits the rectifier to conduct so that a potential is applied to the base of transistor 21. This causes the transistor to conduct so that a circuit path is completed through relay coil 13, thereby opening switch 12. Switch 12 remains open unless the output signal from monitor 11 remains above the threshold level or once again reaches the threshold level.

Conduction by transistor 21 causes transistors 23 and 37 to become nonconducting. The absence of conduction through transistor 37 prevents relay coil 38 from being energized. Prior to this time, relay coil 38 could have been energized if a conductive path to ground had been available through transistor 39. Transistors 37 and 39 thus constitute switching means which control alarm-actuating means 38.

The transmission of a pulse through diode 31 to the gate electrode of rectifier 32 results in conduction through the rectifier. This causes transistor 39 to conduct. However, transistor 37 has become nonconducting at the same time so that relay coil 38 remains deenergized. Conduction by diode 31 applies a potential to the base of transistor 40 to cause transistor 40 to conduct. Conduction by transistor 40 causes transistor 42 to become nonconducting. Prior to this time, transistor 42 was conducting so that capacitor 47 remained substantially discharged. When transistor 42 becomes nonconducting, capacitor 47 is charged by current flow through resistor 48. After a predetermined time interval, the charge on capacitor 47 reaches a sufficiently high level to fire transistor 45. This applies a potential to the base of transistor 51 to cause the transistor to conduct. Conduction through transistor 51 causes transistor 53 to become nonconducting so that current can no longer flow through rectifier 32 and transistor 39 no longer can conduct.

The values of capacitor 47 and resistor 48 are such that the time required to charge capacitor 47 to a voltage sufficiently high to fire transistor 45 is longer than the time required to charge capacitor 27 to a voltage sufficiently high to fire transistor 25, as previously described. If switch 12 is closed a second time by monitor 11 during the period of time that capacitor 47 is being charged to the firing potential of transistor 45, current flows from terminal 19 to ground through transistor 37, relay coil 38 and transistor 39. This results in relay coil 38 being energized to close switch 56 and thereby actuate shutdown device 14 and alarm 58. Thus, the shutdown system and alarm do not become operative unless switch 12 is closed a second time within a predetermined time interval, the charging time of capacitor 47, after having been closed a first time. This prevents the shutdown device from being operated in the event that only a temporary malfunction is noted by monitor 11. It should further be noted that the described circuit is reset automatically by relay coil 13 so as to be in condition to monitor engine 10 after it has been started by an operator or any automatic starting system that may be utilized.

The charging times of capacitors 27 and 47 can be adjusted to different types of operations. In one specific embodiment of this invention, voltage source 15 supplied 12 volts, resistor 28 was 50K ohms, resistor 48 was 100K ohms, and capacitors 27 and 47 were 100 microfarads each. This provided a firing time of transistor 25 of some 3 to 8 seconds, and a firing time of transistor 45 of some 3 to 12 seconds.

While this invention has been described in conjunction with presently preferred embodiments, it obviously is not limited thereto.

What I claim is:

1. In a monitoring system which includes a transducer associated with a device to be monitored, said transducer establishing a first signal representative of a condition to be measured, and a control element associated with the device to be monitored; control apparatus comprising:
   actuating means to actuate said control element when current is supplied to said actuating means;
   a source of current;
   first, second and third switching means;
   circuit means connecting said first switching means, said actuating means, and said second switching means in circuit with said source of current so that said actuating means receives current when said first and second switching means are actuated;
   first timing means to establish a second signal a first predetermined time interval after said first timing means is actuated;
   second timing means to establish a third signal a second predetermined time interval after said first timing means is actuated, said second time interval being longer than said first time interval;
   means responsive to said transducer to actuate said third switching means when said first signal exceeds a threshold value;
   means responsive to said third switching means being actuated to actuate said first timing means and said first switching means;
   means responsive to said second signal to deactuate said first switching means, actuate said second switching means, actuate said second timing means, and deactuate said third switching means; and
   means responsive to said third signal to deactuate said second switching means.

2. The apparatus of claim 1 wherein each of said timing means comprises a unijunction transistor, a capacitor connected to the base of said unijunction transistor, and a resistor connected to said capacitor and said base so that current flow through said resistor charges said capacitor to a voltage sufficiently high to fire said unijunction transistor, the firing of said unijunction transistor establishing an output signal from the timing means.

3. The apparatus of claim 1 wherein said third and first switching means are connected in series between one terminal of said current source and said actuating means, said second switching means comprises a transistor and said third switching means comprises a switch having a relay coil associated therewith which serves to open the switch when current is applied to the relay coil, and wherein said means responsive to said second signal applies current to said relay coil.

4. The apparatus of claim 3 wherein said means to apply current to said relay coil comprises a silicon controlled rectifier, and wherein said second signal is applied to the gate electrode of said rectifier to cause said rectifier to conduct.

5. The apparatus of claim 1 wherein said second switching means is a transistor and wherein said means to actuate said second switching means comprises a silicon controlled rectifier, said means responsive to said third signal serving to block current flow through said rectifier.

UNITED STATES PATENT OFFICE

CERTIFICATE OF CORRECTION

Patent No. 3,597,661                                                  Dated August 3, 1971

It is certified that error appears in the above-identified patent and that said Letters Patent are hereby corrected as shown below:

Column 4, line 18, "first" should read -- second ---.

Signed and sealed this 29th day of February 1972.

(SEAL)
Attest:

EDWARD M. FLETCHER, JR.                  ROBERT GOTTSCHALK
Attesting Officer                             Commissioner of Patents